Jan. 24, 1967  W. E. ADAMS  3,300,355
METHOD OF MAKING IRREGULARLY SHAPED HOLLOW PLASTIC BODIES
Filed June 20, 1963  9 Sheets-Sheet 1
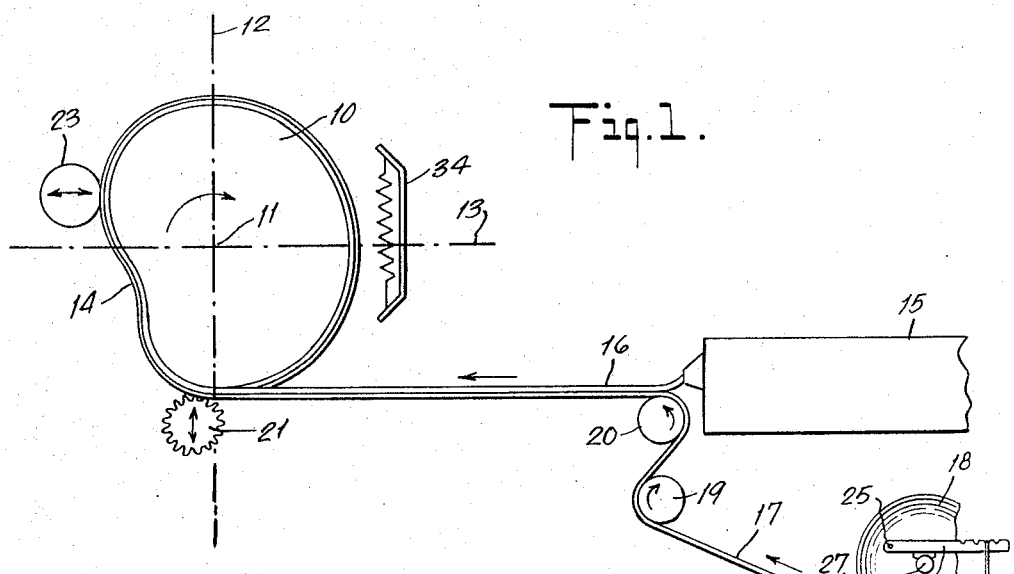
Fig.1.
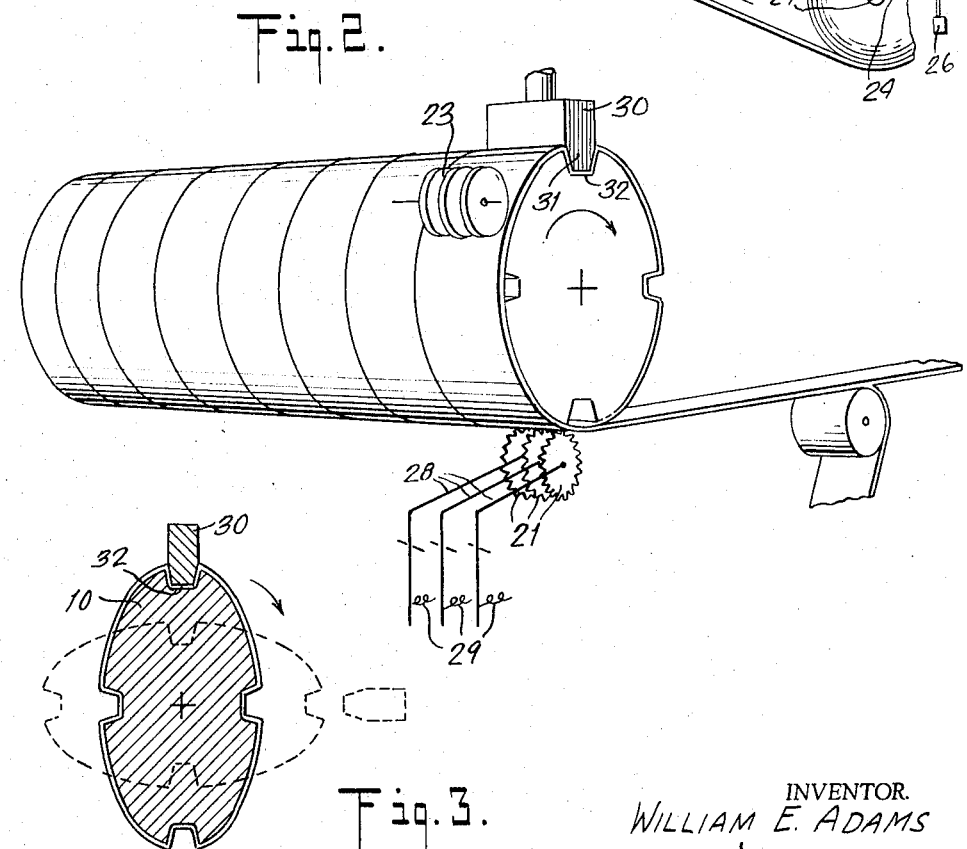
Fig.2.
Fig.3.
INVENTOR.
WILLIAM E. ADAMS
BY
ATTORNEY Jan. 24, 1967  W. E. ADAMS  3,300,355
METHOD OF MAKING IRREGULARLY SHAPED HOLLOW PLASTIC BODIES
Filed June 20, 1963  9 Sheets-Sheet 3

INVENTOR.
WILLIAM E. ADAMS
BY
ATTORNEY

INVENTOR.
WILLIAM E. ADAMS
BY
ATTORNEY

INVENTOR.
WILLIAM E. ADAMS
BY
ATTORNEY

INVENTOR.
WILLIAM E. ADAMS
BY
ATTORNEY

Jan. 24, 1967 W. E. ADAMS 3,300,355
METHOD OF MAKING IRREGULARLY SHAPED HOLLOW PLASTIC BODIES
Filed June 20, 1963 9 Sheets-Sheet 8

INVENTOR.
WILLIAM E. ADAMS
BY
ATTORNEY

United States Patent Office 3,300,355
Patented Jan. 24, 1967

1

3,300,355
METHOD OF MAKING IRREGULARLY SHAPED
HOLLOW PLASTIC BODIES
William E. Adams, New Providence, N.J.
(502 High St., Sterling, N.J. 07980)
Filed June 20, 1963, Ser. No. 289,251
12 Claims. (Cl. 156—189)

This invention relates to methods and apparatus for producing hollow plastic bodies and has particular reference to the production of strong, irregularly shaped hollow articles of manufacture of plastic materials.

One object is to provide a superior method which may be used to effectively produce hollow articles of such unusually complicated shapes as were hitherto considered impossible of production by comparable methods.

It has been proposed to make pipes by winding fabric, which may be coated with a resinous material, onto a mandrel of cylindrical or other uniform shape, but such proposed methods and apparatus are entirely inadequate for the production of irregularly shaped objects in which nevertheless light weight is a great advantage.

My improved method employs a winding technique by which a molten resinous thermoplastic coated fabric strip or tape of any suitable width is continuously wound onto removable mandrels. According to my invention the speed of winding and the direction of application are controlled to accommodate contour changes, and means are provided for forcing the fabric and plastic into drastic irregularities in the shape of the forms mandrels.

According to the invention there is provided special means which may be in the form of soft surface pressure rollers for insuring the welding or unifying of the layers of the plastic coated fabric with each other and with the body of the device, which may be of any irregular shape, as it is in process of formation.

By the use of this invention reinforcing rods or bars may be introduced and incorporated between layers of the plastic. The final result is an extremely light but strong and rugged structure useful for such articles as airplane bodies, automobile bodies, boat hulls and cabins, missile components of complex shape, iceboats and odd-shaped containers, and the like.

Because a thermoplastic resinous material is used, it becomes fluid when heated and solidifies when cooled.

Several embodiments of the invention are illustrated in the accompanying drawings, to which reference will now be had.

FIGURE 1 is an end elevation which illustrates generally the principal features of the invention, although the mandrel is only slightly irregular but clearly presents many of the difficulties which are overcome by the use of the invention.

FIGURE 2 is a perspective view of a mandrel on which fabric tape coated with molten plastic is being wound and which illustrates means for providing longitudinal channels adapted to receive reinforcing bars or rods which are preferably incorporated into the structure.

FIGURE 3 is a sectional view of an elliptically shaped mandrel with a modified position at 90° shown in broken line and a suitable forming tool mechanism for forcing the coated fabric tape into a channel and rotating with the mandrel for a short distance and then releasing the forming tool and returning it into position to enter the next channel as the mandrel rotates.

2

Figure 4:
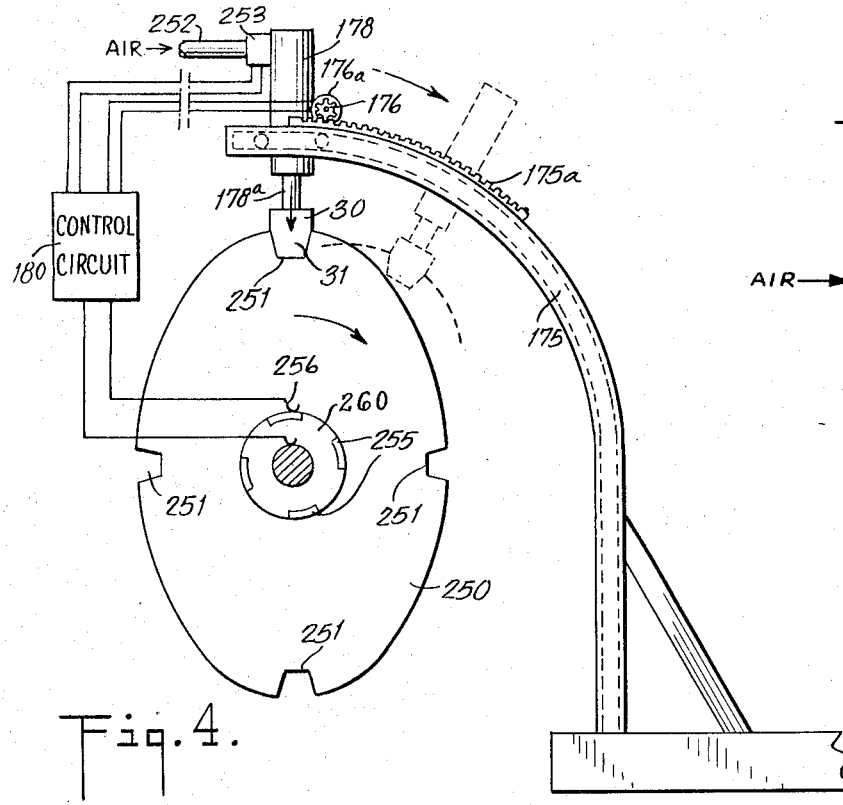
FIGURE 4 is an end elevation and FIGURE 5 is a plan view of a mandrel like that shown in FIGURE 3 but with means for automatically press forming the fabric as each of the longitudinal channels reaches the top as the mandrel rotates.
Figure 4A:
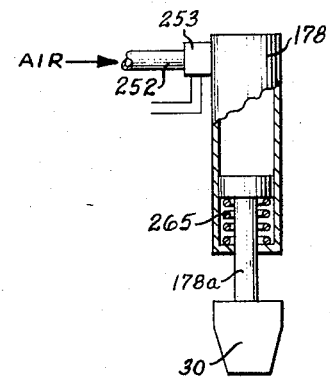

FIG. 4a is a cross-sectional view of the air valve and press block assembly shown in FIG. 4.

Figure 6:
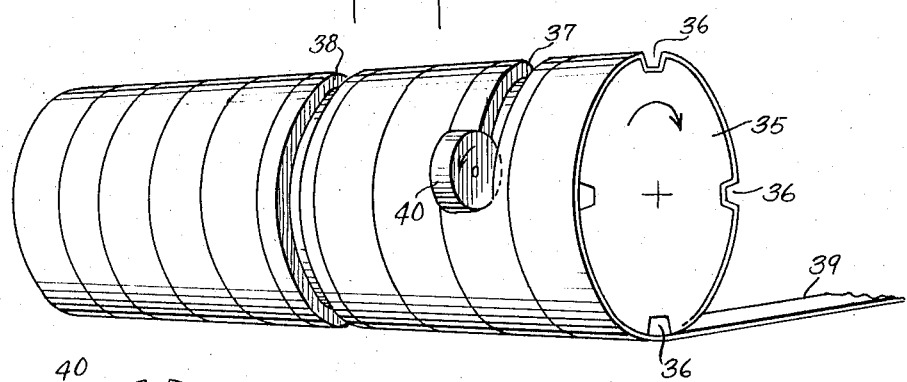

FIGURE 6 is a perspective view which corresponds to FIGURE 2 but illustrates a mandrel for producing a body with circumferential channels in which reinforcing bars, rods or hoops may be inserted.

Figure 7:
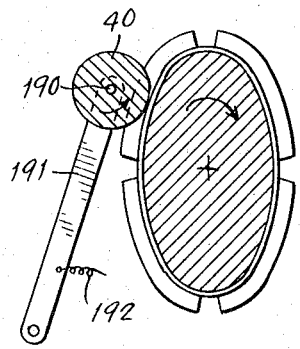

FIGURE 7 is a sectional view of the structure of FIGURE 6.

Figure 8:
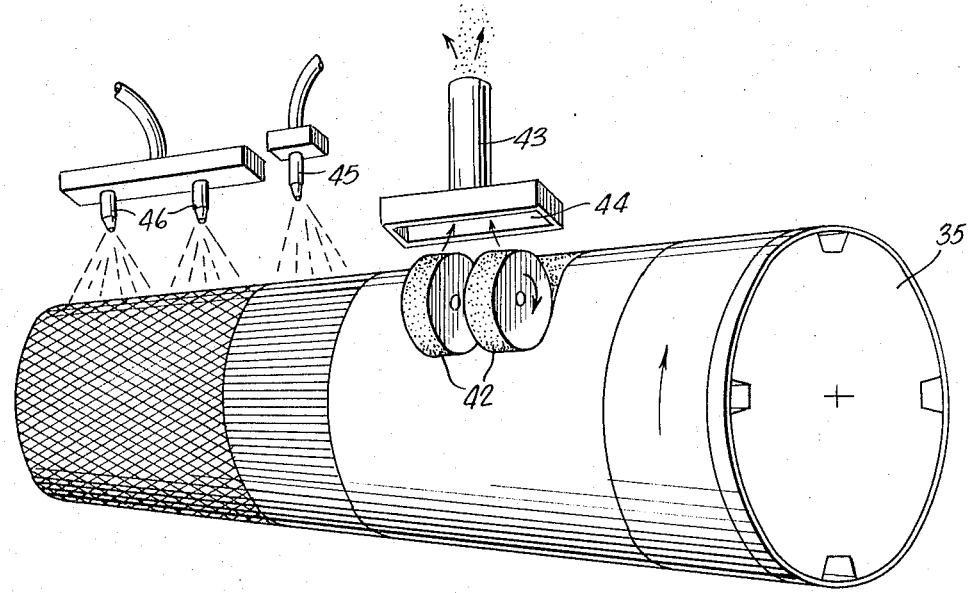

FIGURE 8 shows a structure similar to the preceding figures but illustrates means for providing a special finish on the surface by a sanding and coating operation.

Figure 9:
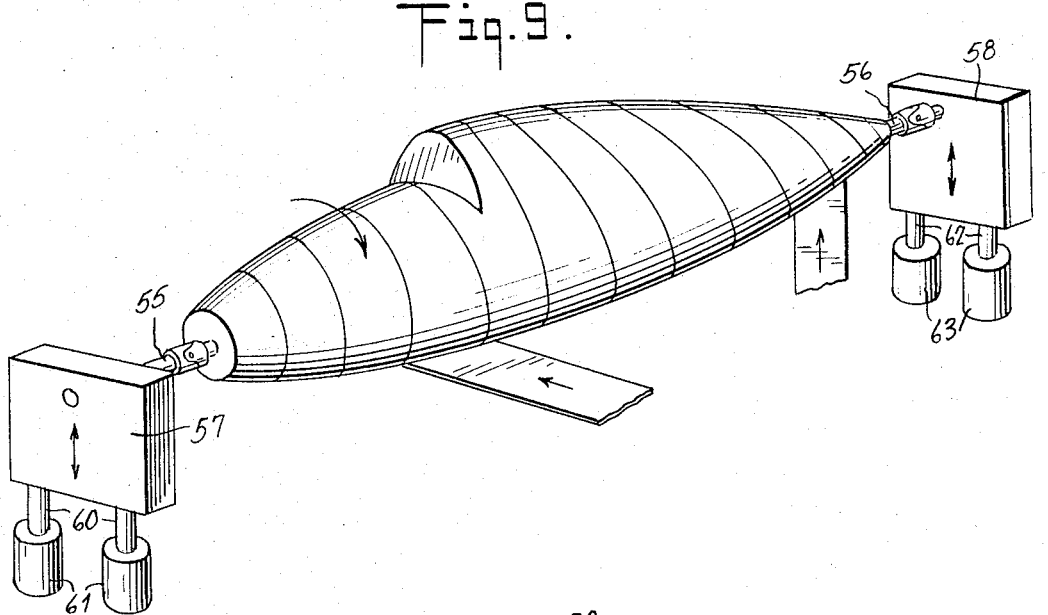
Figure 10:
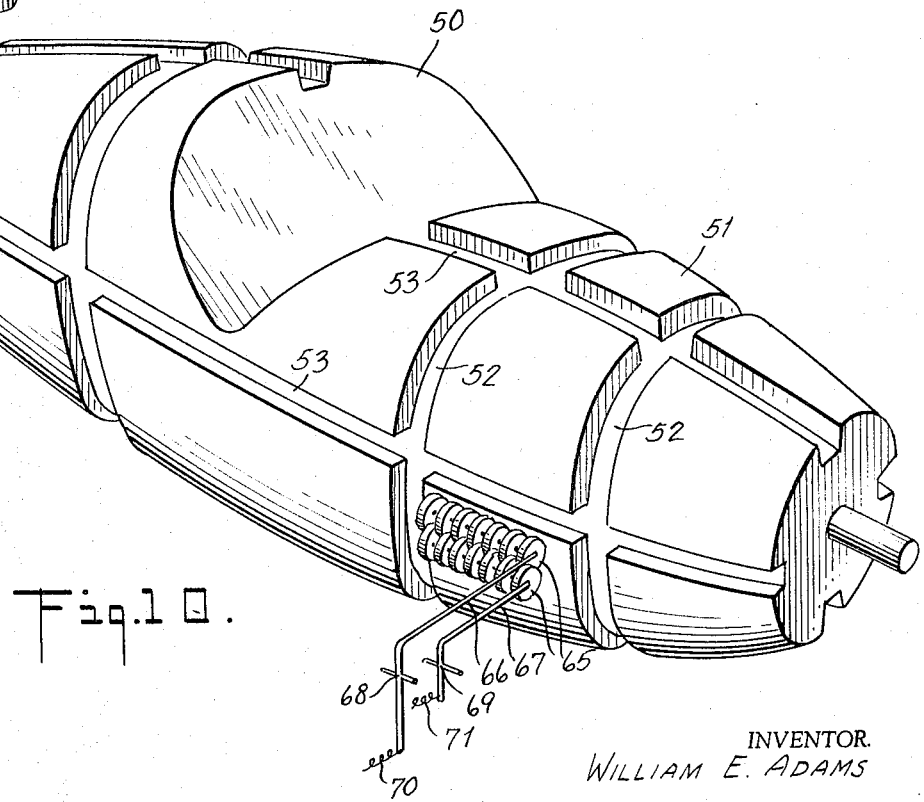

FIGURES 9 and 10 are perspective views showing the application of this invention to the production of an airplane body.

Figure 11:
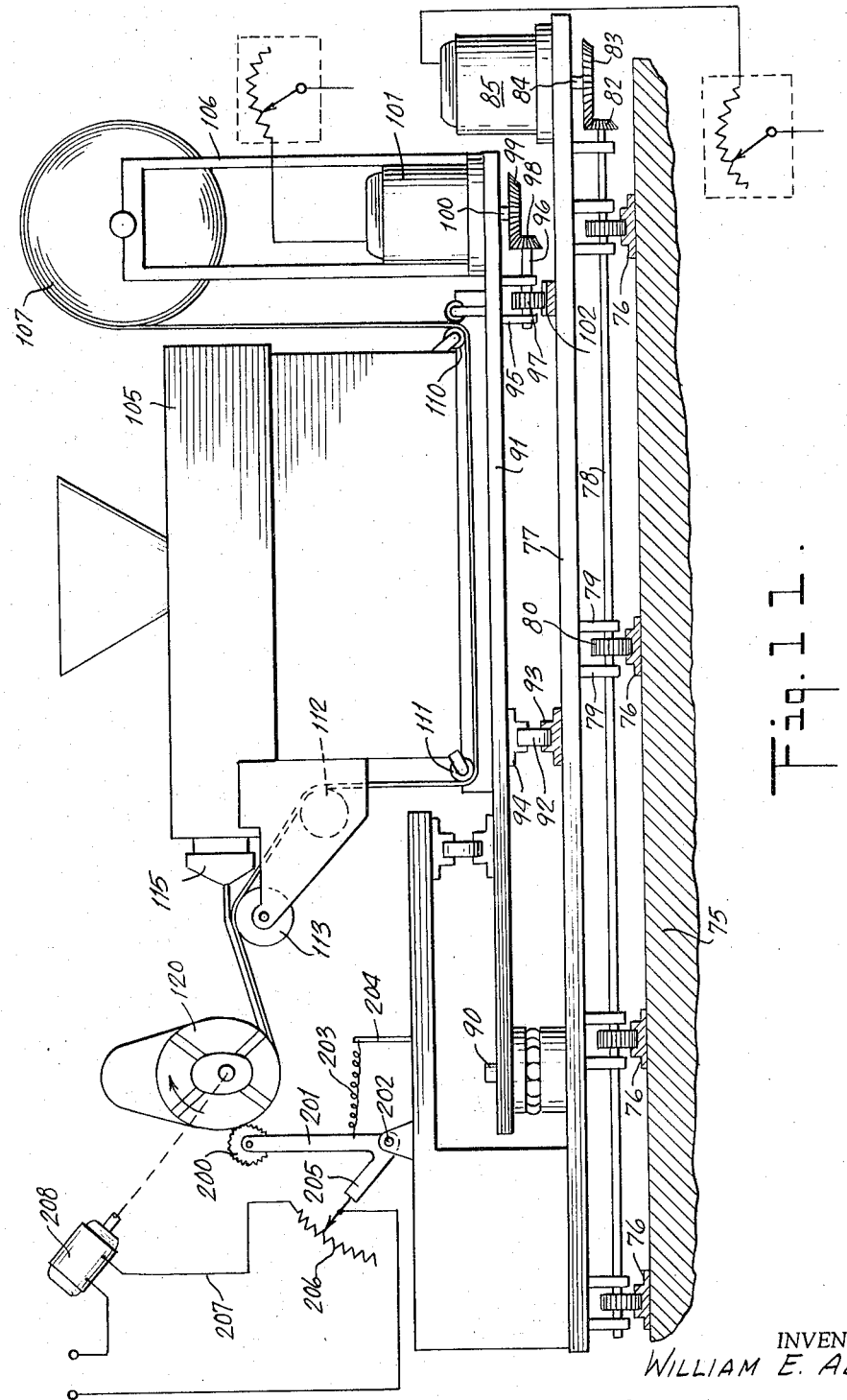
Figure 12:
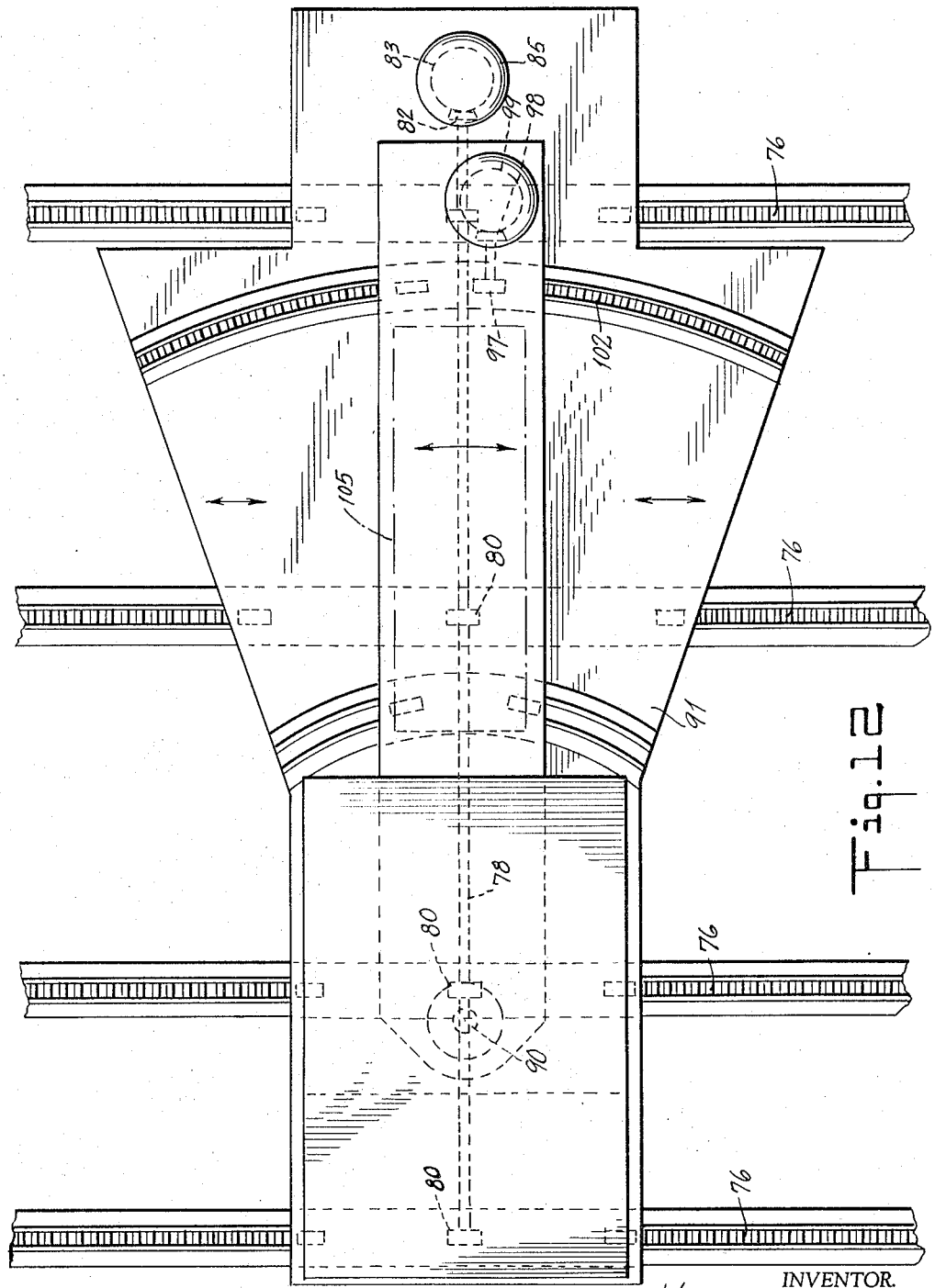

FIGURE 11 is a side elevation, and FIGURE 12 is a plan view of a mechanism equipped with the necessary controls for the production of an article of manufacture such as the airplane body shown in FIGURES 9 and 10.

Figure 13:
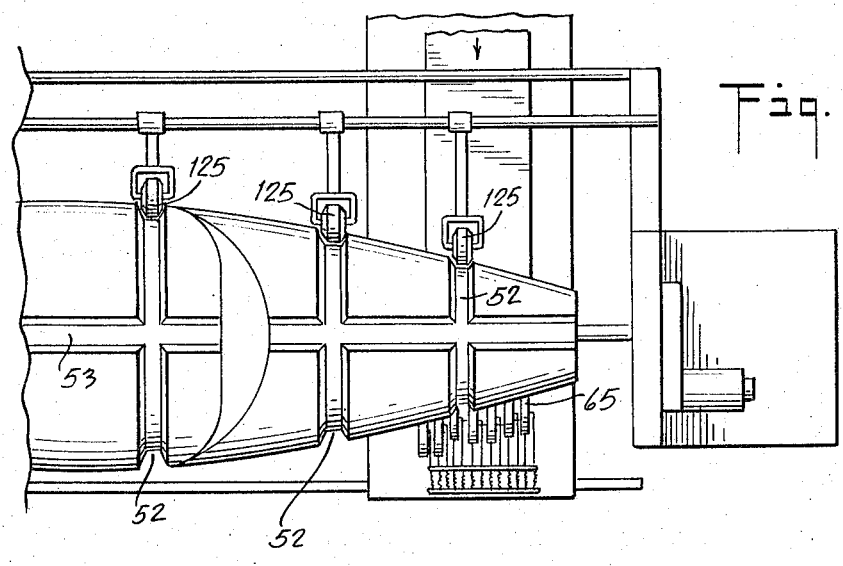

FIGURE 13 is a partially plan view of an airplane body in process of production and includes equipment for rolling the molten plastic fabric strip onto the mandrel as it is applied.

Figure 14:
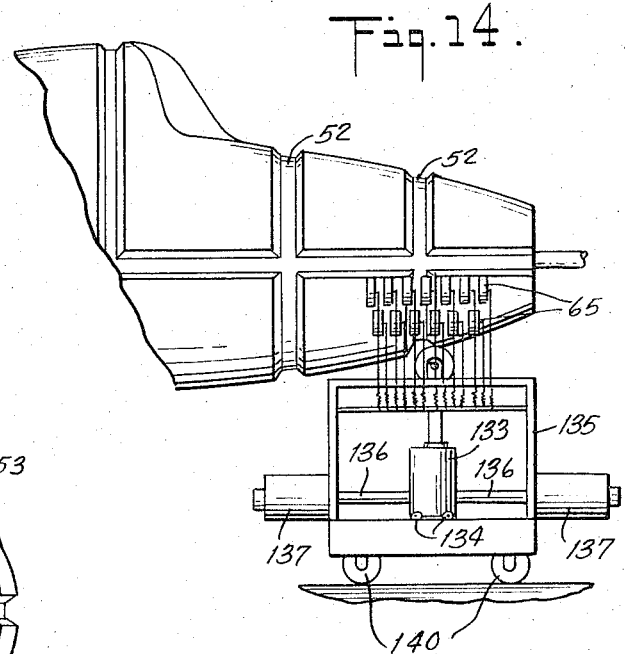
Figure 15:
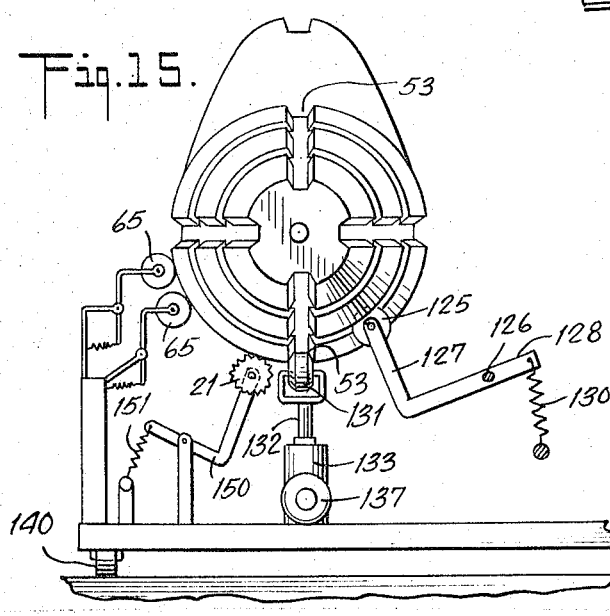

FIGURE 14 is an elevation corresponding to FIGURE 13, and FIGURE 15 is an end view of the same structure.

Figure 16:
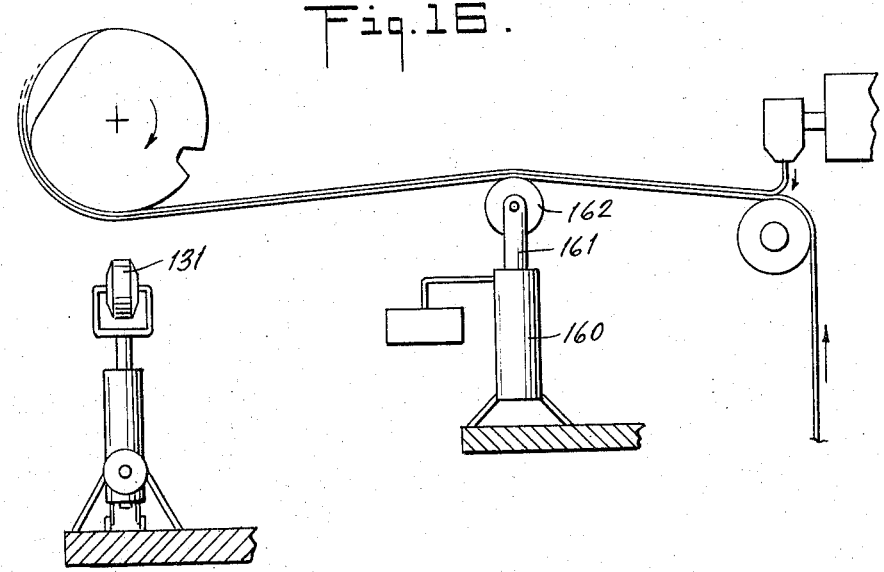

FIGURE 16 is a partially diagrammatic view which illustrates means for taking up slack as the molten plastic strip is continuously produced while the mandrel is momentarily stopped to permit the forming of a longitudinal channel in the plastic body under construction.

Figure 17:
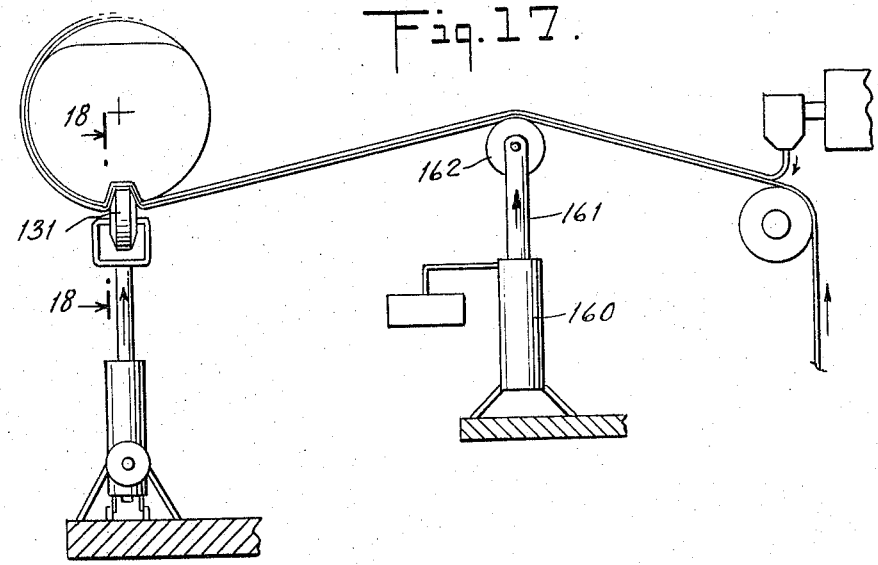

FIGURE 17 is another view illustrating the equipment when the mandrel is momentarily stopped.

Figure 18:
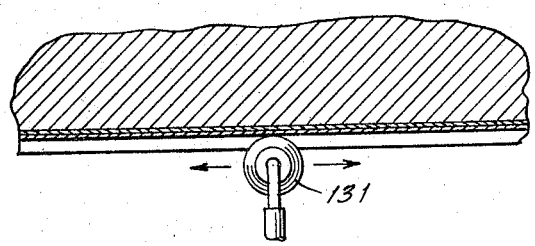

FIGURE 18 is a partial section on the line 18—18 of FIGURE 17.

Figure 19:
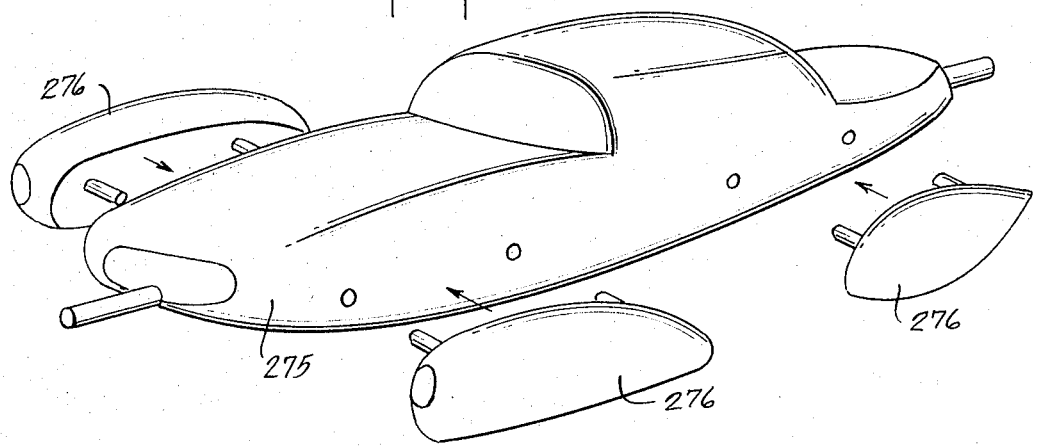
Figure 20:
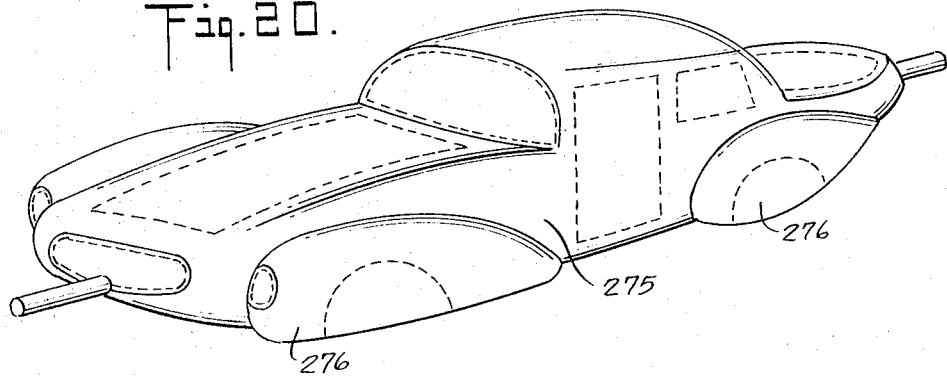
Figure 21:
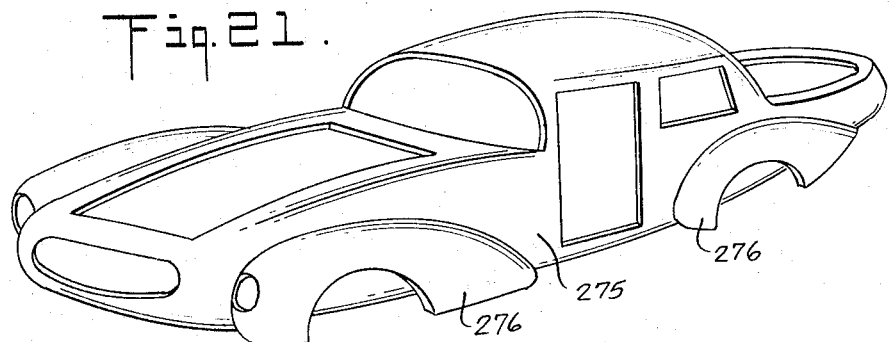

FIGURES 19, 20 and 21 show an automobile body in course of production, the fender forms being spaced away from the body in FIGURE 19, the thermoplastic body being completely wound in FIGURE 20 and shown in FIGURE 21 as a finished product with windows, doors and openings for wheels cut out after the structure has been completely formed by the thermoplastic winding method of this invention.

Referring to FIGURE 1, a mandrel 10 having a longitudinal axis 11 and transverse axes 12 and 13 has an irregular shape including a concave side 14.

An extruder 15 discharges continuously a layer 16 of molten thermoplastic resin. A roll of fabric on spool 18 supplies a fabric tape 17 around guide rollers 19 and 20, the arrangement being such, as shown, that the fabric extends substantially in a horizontal path and the layer of extruded thermoplastic resin in a molten condition joins the fabric tape as it leaves the roller 20. The molten thermoplastic resin coated fabric tape is wound onto the mandrel 10, and shortly after the contact of the coated tape with the mandrel 10, a series of toothed wheels 21 are mounted so as to bite into the molten thermoplastic resin coating through the tape, thus providing for the thermoplastic material to flow into the fabric and to insure a close welding or unifying action. These toothed wheels are also important because they prevent the tape layers from slipping as they are applied to a tapering body or sloping surface. The application of the toothed wheels will be apparent from FIGS. 13, 14 and 15, one such wheel being shown in FIG. 15. These toothed wheels, as shown in FIGURE 2, are spaced very close to one another and any number may be employed sufficient to extend across the width of the fabric tape. These toothed wheels are individually mounted on levers 28, and each lever has its spring 29, so that the wheels press against and perforate the tapes regardless of whether the molten thermoplastic resin coated fabric is being applied to the convex surface of the mandrel 10 or to the concave portion of the surface of the mandrel. These toothed wheels not only follow irregular contours but also definitely prevent the thermoplastic resin coated fabric tapes from slipping out of place on the surface of the mandrel as above described.

The smooth surface rollers 23 are also spring-mounted, as shown in FIGURE 13, and force the thermoplastic resin coated tape into intimate contact with the mandrel or with the previously applied layer of tape. These rollers are very important to prevent wrinkling of the tape as it is being applied, and thus insure a smooth outer surface. They are preferably provided with soft and conforming surfaces, and a plurality of such rollers is well shown in FIG. 10.

The tension in the fabric tape is adjustable as shown in FIGURE 1 by a yardarm 24 pivoted at 25 and provided with a weight 26 which may be adjusted along the outer end of the yardarm and thus regulate the pressure applied to a brake drum 27 on the spool 18.

Means for providing longitudinal channels in the hollow plastic body under construction is illustrated in FIGURES 2 and 3. A press block 30 having an extension 31 shaped to correspond to the longitudinal channel 32 is adapted to cover the width of the molten thermoplastic resin coated tape, and as the coated tape is being applied, the block is forced into the channel and is so mounted as to ride around with the turning of the mandrel to about 30°, when it is retracted and leaves the plastic structure with the desired shape. As soon as retracted, the block 30 returns to its initial position and is ready to enter the next channel when it reaches the initial position, as shown in FIGURE 2.

Figure 5:
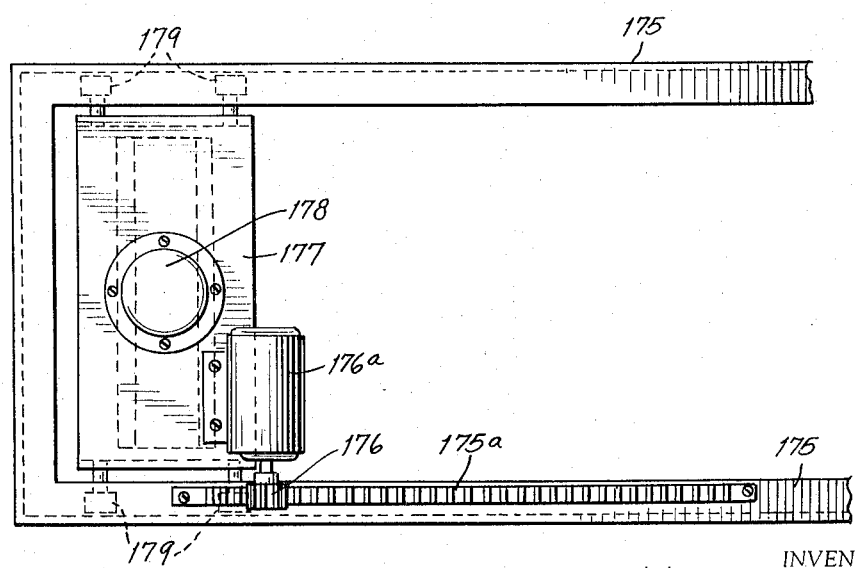

A suitable mechanism for accomplishing the foregoing movement is illustrated in FIGURES 4, 4a and 5. An arcuate track composed of channel bars 175 has gear rack teeth 175a with which meshes a gear wheel 176 driven by motor 176a mounted on a platform 177. A cylinder 178 is firmly affixed to the platform, and a cooperating piston 178a is connected to the extension 31 of the press block 30. The track is curved to correspond generally to the outer surface of the mandrel but may be spaced further from the mandrel at its lower end. However, it is preferable that the track be substantially parallel to the surface of the mandrel so that the press block 30 continues in the channel as the platform rides down the track. By an automatic electric control mechanism 180 the cylinder is actuated by air to force the press block into the channel at the top and is oppositely actuated to retract the press block at the lower end of the track. The platform has rollers 179 which ride in the channel bars 175 and is driven by an electric motor 176a, and the motor may be reversed when the press block is retracted or the platform may be retrieved by a weight or spring when the piston raises the press block. In either case the platform is quickly returned to its initial position so that the press block is ready to enter the next longitudinal channel of the structure.

An electric heater 34, which is preferably a radiant heater is mounted near the mandrel so as to prevent the winding already on the mandrel from cooling and solidifying before the next layer is applied. In this way the cooling and solidifying of the body under construction occurs when the winding is completed.

Referring to FIGURES 6 and 7, the mandrel 35 may have the longitudinal channels 36, as already described in connection with the modification of FIGURES 1, 2 and 3, but in this arrangement there is a plurality of circumferential channels 37 and 38 into which reinforcing cables, hoops or the like may be introduced, and after such introduction the winding operation is continued, so that the reinforcing members will be imbedded in the finished product. As the molten plastic coated tape here indicated by 39 is wound over the channel, a roller 40 is mounted as shown at 37 to force the coated tape into the channel as indicated in FIGURE 6. The roller 40 is formed to correspond to the opening of the channel which is preferably tapered to facilitate the introduction of the plastic coated tape. The roller 40 is mounted on axle 190 which is carried on a lever 191, and the roller is resiliently forced into the channel by spring 192 so that it will follow the channel whether the mandrel 35 is cylindrical in its general form or elliptical in cross section or has some other configuration.

Referring to FIGURE 8, as here shown the hollow body has been completely formed on the mandrel 35, and in order to improve the external finish a plurality of sanding wheels or rollers 42 are mounted to sand the surface and preferably an exhaust pipe 43 having an intake nozzle 44 is adapted to withdraw, and discharge at some distance away, the dust and cuttings resulting from the sanding operation. Following the sanding operation, an undercoating of plastic is sprayed onto the plastic body through nozzle 45, and a finishing coat of suitable material such as lacquer is applied through nozzles 46, the arrangement being such that the above described elements move longitudinally of the mandrel 35 as it is stationary, or the mandrel with the hollow body supported thereon is moved longitudinally so that the body is first sanded, then is sprayed with an undercoat and then sprayed with a final coat in succession.

Referring to FIGURES 9 and 10, the above described principles are incorporated in a suitable mandrel for the production of an airplane body. As here shown, the cabin portion 50 is substantially enlarged to give the necessary interior cabin space, and the nose of the airplane is formed into a smaller body 51, which will ultimately become the engine compartment of the airplane.

In a structure of this character the circumferential and longitudinal channels 52 and 53 are of primary importance to strengthen and stiffen the body.

As illustrated in FIGURE 9, the mandrel on which the airplane body is built up is supported on axle extensions 55 and 56 which are mounted through universal joints 55a and 56a in bearing blocks 57 and 58. The block 57 is mounted on hydraulic pistons 60 which are actuated by cylinders 61. Likewise bearing block 58 is mounted on pistons 62 actuated by cylinders 63. These cylinders and pistons at opposite ends of the mandrel on which the airplane body is being formed may be actuated by compressed air or hydraulically or in any other suitable manner. They are intended to permit the axis of the mandrel and of the body under construction to be tilted in one direction or the other, which enables the approaching molten plastic coated fabric to be wound onto the body smoothly and effectively.

As already described in connection with the previous embodiments of the invention, pressure wheels 65 are mounted on axles culminating in levers 66 and 67, pivoted at 68 and 69 and resiliently pressed against the body of the mandrel and against the body of the plastic structure under production, by springs 70 and 71. The rollers are spaced from one another, but they overlap so that they are more effective in insuring the smooth winding of the molten plastic coated fabric onto the mandrel.

As above indicated, it is feasible to move the entire mandrel longitudinally as it is rotated and thus accomplish the desired objective while the fabric roll, guide rolls, the extruding mechanism and the speed control mechanism are relatively stationary. On the other hand, when large hollow objects such as airplane bodies, boat hulls, and the like are being constructed, it may be preferable that the mandrel on which the body is being formed, is rotated but is not moved longitudinally on its axis, and this is feasible by the use of the equipment as shown and described in FIGURES 11 and 12.

As here shown, a base plate or foundation 75 has mounted thereon a plurality of parallel racks 76, and a movable platform 77 has a plurality of shafts 78 mounted on its underside by bearing members 79 and gear wheels 80 mounted on the shaft 78 between each set of bearings 79 meshed with racks 76. The shaft 78 has attached to one end a bevel gear 82 which meshes with the bevel gear 83 which is mounted on the shaft 84 of an electric motor 85. The motor is mounted on the platform 77, and when it is actuated the gear 83 turns the gear 82 and the shaft 78, thereby causing the entire platform 77 to move forward or backward on the base 75.

The platform 77 has a vertical axis shaft 90 on which an upper platform 91 is pivoted. The platform is guided and supported as it turns around the axis 90 by rollers 92 which run in a circular-shaped track 93 on top of the platform 77 and cooperate with an upper track 94 which projects downwardly from the upper platform 91. Near the outer end of the upper platform 91 is a bearing structure 95 which supports the shaft 96. A gear wheel 97 is mounted on the shaft 96 within the bearing structure 95, and at the outer end of the shaft 96 is a bevel gear 98 which cooperates with the gear 99 mounted on the shaft 100 of another electric motor 101. When this motor is actuated, the bevel gear 99 meshes with the gear 98 and turns the shaft 96 and the gear wheel 97 which cooperates with a circular rack 102 mounted on the top of the upper platform 91.

An extruder mechanism 105 is mounted on the upper platform 91. A frame 106 is also mounted on the upper platform 91. A fabric roll 107 is rotatably mounted on top of the frame 106, and extruder mechanism 105 carries guide rolls 110, 111, 112 and 113 over which the fabric tape from the roll 107 progresses. The extruder is provided with the usual means of heating and regulating the plastic material so that it is maintained at the proper temperature to be extruded through extrusion die 115.

As shown in FIGURE 11, the extruded strip of plastic material is close to and immediately flows onto the fabric tape as it progresses over roller 113. The internal heating and extruding mechanisms of the extruding device 105 are well known and are not shown.

When the changes in contour of the mandrel result in a substantially smaller diameter on which the winding of the plastic coated web is to continue, it is desirable for the best results to increase the rotational speed of the mandrel so as to keep the linear surface speed practically constant.

One of the objectives obtained by this invention is the automatic adjustment of the speed of the rotation of the mandrel during the winding operation so as to approximate the continuous surface speed regardless of marked changes in the shape and size of the mandrel from end to end.

A suitable means for accomplishing this is illustrated in FIGURE 11 and comprises a toothed wheel 200 mounted on a lever 201 which is pivotally supported at 202 on the top of the platform 71 of FIGURE 11. The toothed wheel is pulled against the outer surface of the mandrel by spring 203 mounted on bracket 204, and inasmuch as the wheel is mounted on the platform 71, it will move longitudinally of the mandrel 120 during the winding operation and will maintain contact with the web as it is wound.

The lever 201 has an arm 205 of a rheostat 206 which is inserted in the circuit 207 of a motor 208 which through suitable means, as indicated, rotates the mandrel 120 on its axis.

In order that the purpose and utility of the mechanism shown in FIGURES 11 and 12 may be fully appreciated, its operation will now be described. If it is assumed that one of the mandrels, such as for example mandrel 120 shown in FIGURES 9 and 10, is mounted on its longitudinal axis and is rotated by motor 208, it will be desirable first to set the extruder and all the equipment mounted on the upper platform 91 at an angle, which is accomplished by operating motor 101 to make the necessary adjustment in a circular direction. Then the main platform 77 with all of the equipment mounted thereon is advanced by actuating the motor 85. The speed of this advancing movement will depend on the speed at which the body, such as shown in FIGURE 9, is rotated on its longitudinal axis. If desired, the longitudinal axis of the device under construction as shown in FIGURE 9 may be tilted on its transverse axis to a greater or less degree, the object being to insure that the plastic coated tape is smoothly wound onto the body under construction with no wrinkles or improper overlap, regardless of the changing shape of the body. When the construction proceeds, say to the point about the middle of FIGURE 9, the mandrel tapers in the opposite direction toward the tail of the airplane, and hence during the time that the winding is passing over the center of near the center, the extruder and all the mechanism mounted on the upper platform 91 will be adjusted back to about the mid point the same as if the mandrel and object under construction were cylindrical. Then as the work progresses down the taper in the opposite direction, the motor 101 will be adjusted in the opposite direction to again accommodate to a maximum degree the shape of the mandrel in use.

In the arrangement of FIGURES 11 and 12 the mandrel 120 rotates on its longitudinal axis and is not necessarily provided with means for having any rotatable adjustment on any transverse axis. In this case the adjustments for the purpose of controlling the direction of the web onto the mandrel as it varies in size and shape is provided for by adjusting the web spool and the extruder not only to advance the web as it is wound onto the mandrel, which is accomplished by motor 85, but also to vary the angle at which the web approaches the mandrel by swinging the web spool and the extruder by actuating motor 101, thereby pivoting the platform 91 about its vertical axis 90 in one direction or the other.

It should, of course, be understood that the mandrel itself, as shown for example in FIGURE 9, may be not only turned on its longitudinal axis, but also adjusted about a transverse axis, thereby providing the desired angle of approach of the web onto the mandrel as the shape and contour of the mandrel are changing. It should be understood that what is desired in a relative adjustment between the mandrel and the approaching web, and this can be accomplished either by the arrangement of FIGURES 11 and 12 or by that of FIGURE 9.

Certain details of the operation and equipment are well illustrated in FIGURES 13, 14 and 15 in which like parts are designated by the same reference characters as used in FIGURES 9 and 10.

The circumferential channels 52 are made as the structure is being constructed by forming rollers 125 which are mounted, as clearly shown in FIGURE 15, on frame 126 by angle levers 127. It will be understood that the mandrel has like channels with which the fabric is formed. Each lever has an outer extension 128 to which spring 130 is attached. The spring at all times acts on the lever 127 so as to force the forming wheel 125 into the circumferential channel 52 with which it cooperates. The longitudinal channels 53 are made by forming rollers 131, only one of which is shown in FIGURE 15. This roller is mounted on the piston 132 which operates in cylinder 133 and may be forced either by compressed or hydraulically into the channel at the appropriate time. The cylinder 133 is mounted on rollers 134 in a carriage 135. The cylinder 133 is moved longitudinally of the axis of the body under construction by pistons 136 which operates in cylinders 137.

With this arrangement, when a certain amount of plastic coated tape has been wound, the rotation of the body is temporarily stopped. The rollers 131 are then forced against the plastic coated tape already wound so as to form the channels 53. The carriage 135 is mounted on wheels 140, and before the next operation it can be moved forward along the line of winding.

FIGURE 14 well illustrates the mounting of the smoothing or forming rollers 65 which are expected, as shown in FIGURE 10, to cover the complete surface as the operation progresses. The toothed wheels, such as 21, shown in FIG. 15 are mounted on levers and pressed into working position by springs 151. The toothed wheels act independently and thus more effectively act on the full width of the plastic coated tape being applied.

The fabric web may be pulled from the spool by the tension produced as the mold rotates and the plastic coated web is wound thereon, as shown in FIGURE 1, in which case the tension may be varied as there shown by the use of a brake and adjustable weight. However, the fabric webs may be fragile or easily distorted in shape, in which case it is undesirable to put tension on the web as above described. It is then desirable to provide a separate drive motor to rotate the spool as shown in FIGURES 16 and 17. The speed of the spool will be adjusted so that the web is delivered at substantially the same speed as the web is wound onto the mandrel, but if the mandrel is temporarily stopped to form the plastic coated web into a longitudinal channel, as shown in FIGURE 17, then the cylinder 160 and long piston 161 will automatically come into play, push the roller 162 upward and take up the slack in the web during the very short time that the mandrel is stationary.

As indicated in FIGURES 16 and 17, a stationary cylinder 160 has a vertical piston rod 161 on which is mounted a drum 162. The cylinder is comparatively long so that the piston when actuated by air pressure or otherwise may push the drum 162 a considerable distance upwardly. This provides a means for allowing the mandrel rotation to stop while the longitudinal rib forming roll 131 is pressing the molten plastic coated fabric into the channel while the fabric is continuing to unroll from the spool and the extruder is still extruding molten plastic onto the fabric. When forming is completed, the mandrel starts rotating again and the slack in the plastic coated fabric is taken up.

The extruder and the fabric spool in this arrangement are spaced at a substantial distance away from the mandrel or body onto which is being wound, and the spool 162 constitutes a guide on which the tape rests at about the intermediate point of its length.

A suitable means for actuating the press block to form the longitudinal channels as the web is wound on the mandrel is illustrated in FIGURES 4 and 5 in which the mandrel 250 has four longitudinal channels 251, and the press block 30 is attached to the piston 178a of a compressed air cylinder 178. 252 is a suitable source of compressed air, and an air valve 253 is in the line to the cylinder 178.

A series of electrical contacts 255 and a brush 256 automatically control the action of the piston and press block 30. The contacts 255 are spaced on a small cylinder 260 mounted on the end of the mandrel 250.

The contacts are spaced from each other to correspond with the spacing of the longitudinal channels in the mandrel. As the mandrel rotates, the brush rides on the cylinder, and the brush 256 makes electrical connections with one of the contacts just at the time when the corresponding channel is opposite the press block.

The actuation of the control circuit 180 temporarily opens the air valve 253 and actuates the piston 178a forcibly pushing the press block 31 into the channel. This action is momentary because the brush 256 quickly passes off of the contact, and a spring 265 in the cylinder 178 may immediately retract the press block without interfering with the rotation of the mandrel. This structure is well shown in cross-section in FIG. 4a.

Referring to FIGURES 19, 20 and 21, the invention is here shown as applied to the production of a hollow plastic automobile body.

As shown in FIGURE 19, the fender forms are spaced from the body and the operation will first be partially completed by winding a predetermined number of plastic coated fabric turns over the entire body 275. The fender forms 276 are then mounted in place on the body 275 as shown on FIGURE 20.

After the fender forms 276 are in place, the winding will be continued until the desired ultimate thickness of plastic coated fabric has been built up.

The automobile body is then complete except that holes for the doors, windows, hood and trunk are yet to be cut out.

When this cutting operation is completed, as shown in FIGURE 21, then the bottom is cut away to permit the mandrel and fender forms to be removed.

Various modifications and adaptations may be made without departing from the spirit of the invention, and only such limitations should be imposed as are indicated in the appended claims.

I claim:

1. In a method for producing an irregularity shaped hollow plastic body which comprises providing a mandrel having a plurality of longitudinal slots in the surface thereof, rotating the mandrel on a longitudinal axis, feeding a web of fabric so as to deliver said web in position to be wound onto the mandrel when rotated about its longitudinal axis, extruding a molten thermoplastic resinous substance onto the web, forcing the press block into the slots at each turn of the mandrel carrying the press block circumferentially with the mandrel for a small angle, releasing the block and returning it to a position to enter the next longitudinal slot, introducing reinforcing elements in the longitudinal slots at an intermediate point in the winding and winding the thermoplastic coated web over the slots to incorporate the reinforcing elements into the plastic body.

2. A method for producing an irregularly shaped hollow plastic body which comprises mounting a mandrel corresponding in shape to the irregularly shaped hollow plastic body to rotate on more than one axis, rotating the mandrel on one of said axes, winding a fabric web onto the mandrel as it is rotated on said axis, winding the fabric web onto the mandrel as it is rotated on the second axis to position the web on the mandrel so as to accommodate the irregularities of the mandrel, extruding a molten thermoplastic resinous substance onto the entire surface of the web as it is being wound onto said mandrel and applying heat to keep the themoplastic resinous substance fluid until the wound plastic body is completed and allowing the thermoplastic resinous substance to cool and harden until the plastic body is solidified.

3. The method of claim 2 in which the fabric is performated by a plurality of independent toothed wheels at the points of irregularity of the mandrel so as to enable the fabric to be permeated with the thermoplastic resin.

4. The method of claim 2 in which the speed of rotation of the mandrel is varied to accommodate variations in the diameter of the mandrel.

5. The method of claim 2 in which the speed of rotation of the mandrel is increased when the web is being wound on small diameter portions of the mandrel.

6. The method of claim 2 in which at least one of the axes of the mandrel is adjustable whereby the web may be fed onto the mandrel at any desired angle.

7. The method of claim 2 in which the mandrel has longitudinal channels and the plastic web is forced into the channels.

8. The method of claim 7 in which reinforcing means is introduced into the channels prior to the completion of the winding of the fabric whereby the reinforcing means is incorporated in the structure when the winding has been completed.

9. The method of claim 1 in which the fabric is perforated by a plurality of toothed wheels resiliently applied at the points of irregularity of the mandrel and so as to enable the fabric to be permeated with thermoplastic resin.

10. The method of claim 1 in which the speed of rotation of the mandrel is varied to accommodate variations in the diameter of the mandrel.

11. The method of claim 2 in which the web is smoothed and unified as it is wound onto the mandrel by applying individually acting overlapping, resiliently mounted rollers having soft conformaing surfaces to the webs.

12. The method of claim 1 in which the web is smoothed and unified as it is wound onto the mandrel by applying individually acting overlapping, resiliently mounted rollers having soft conforming surfaces to the webs.

References Cited by the Examiner

UNITED STATES PATENTS

| | | | |
|---|---|---|---|
| 1,504,491 | 8/1924 | Nicholson | 156—298 |
| 2,729,268 | 1/1956 | Broughton et al. | 156—325 X |
| 3,018,212 | 1/1962 | Chinn | 156—244 X |

EARL M. BERGERT, *Primary Examiner.*

P. DIER, *Assistant Examiner.*

UNITED STATES PATENT OFFICE
CERTIFICATE OF CORRECTION

Patent No. 3,300,355 January 24, 1967

William E. Adams

It is hereby certified that error appears in the above numbered patent requiring correction and that the said Letters Patent should read as corrected below.

Column 1, line 9, strike out "and apparatus"; line 30, strike out "forms"; column 6, line 13, for "of" read -- or --; line 40, for "in" read -- is --; line 60, after "compressed" insert -- air --; lines 64 and 65, for "operates" read -- operate --; column 8, line 17, for "irregularity" read -- irregularly --; line 24, for "the", second occurrence, read -- a --; line 50, for "performated" read -- perforated --; column 9, line 6, for "conformaing" read -- conforming --; column 10, line 5, for "156-325X" read -- 156-425X --.

Signed and sealed this 9th day of January 1968.

(SEAL)
Attest:

Edward M. Fletcher, Jr.
Attesting Officer

EDWARD J. BRENNER
Commissioner of Patents